United States Patent [19]

Stoll

[11] 4,233,887
[45] Nov. 18, 1980

[54] PISTON-CYLINDER UNIT

[76] Inventor: Kurt Stoll, Lenzhalde 72, 7300 Esslingen, N, Fed. Rep. of Germany

[21] Appl. No.: 952,602

[22] Filed: Oct. 18, 1978

[30] Foreign Application Priority Data

Oct. 25, 1977 [DE] Fed. Rep. of Germany ....... 2747676

[51] Int. Cl.³ ............................................. F16J 11/02
[52] U.S. Cl. ...................................... 92/169; 92/171; 403/337
[58] Field of Search ............ 92/171, 169, 170, 165 R; 403/262, 337

[56] References Cited

U.S. PATENT DOCUMENTS

| | | | |
|---|---|---|---|
| 1,801,395 | 4/1931 | Summers | 92/171 |
| 1,819,759 | 8/1931 | Valletta | 92/169 |
| 2,201,862 | 5/1940 | Heisterkamp | 285/55 |
| 2,279,671 | 4/1942 | Ford | 91/171 |
| 2,538,499 | 1/1951 | Benoit | 403/337 |
| 3,162,181 | 12/1964 | Horon | 92/171 |
| 3,202,063 | 8/1965 | Bissell et al. | 92/169 |

*Primary Examiner*—Paul E. Maslousky
*Attorney, Agent, or Firm*—Blanchard, Flynn, Thiel, Boutell & Tanis

[57] ABSTRACT

A piston-cylinder unit having structure incorporated into the cylinder housing which will facilitate the connection of an end cap member without affecting the thickness of the sidewall construction of the cylinder housing. One end of the cylinder housing has a flared end, particularly a radially extending flange with one axially facing surface thereof forming a stop surface. The other axially facing surface forms a contact surface. The end cap member is composed of two parts, one part being the end cap itself with a central opening therein receiving the piston rod therethrough. The other part is a screw collar ring having internally threaded holes therein for receiving screws to effect a coupling of the end cap member thereto. The end cap member engages the stop surface and the screw collar ring engages the contact surface. A tightening of the screws will effect a clamping of the radial flange between the end cap member and the screw collar ring.

1 Claim, 2 Drawing Figures

PISTON-CYLINDER UNIT

FIELD OF THE INVENTION

The invention relates to a piston-cylinder unit comprising a cylinder housing having at least one end associated with a cylinder end cap having a portion which is releasably guided for example with the aid of screws into engagement with a radially directed stop surface on a flange on the cylinder housing and a srew collar ring which is loosely positioned on the cylinder housing and is moved toward the cylinder end cap along the axis of the cylinder housing into engagement with a radially projecting contact surface on the flange.

BACKGROUND OF THE INVENTION

An annular groove is worked into the wall of the cylinder housing adjacent its one end in conventional arrangements of this type, into which annular groove is inserted for example a slotted clamping ring. During a guiding of the cylinder end cap against the screw collar ring, the cylinder end cap abuts the edge of the one end of the cylinder housing, while the screw collar ring rests on the clamping ring.

Due to the annular groove which receives the clamping ring, the cylinder housing must have a substantially thicker wall than is necessary with respect to strength requirements concerning the medium pressures occurring inside of the cylinder housing. Thus the conventional arrangement uses much material and is relatively expensive to manufature. The expense is additionally particularly increased by the clamping ring being a separate part. Furthermore relatively heavy cylinder housings are obtained due to the great wall thickness. Finally, the massive construction of the cylinder housing wall has the disadvantage that for reasons of cost, often no corrosion-resistant material is used, so that the known arrangements are not suited for use for example in the food industry, the chemical industry, the drink industry or in electroplating.

Similar disadvantages exist also in a different type of connection between the cylinder housing and the cylinder end cap, in which the cylinder end cap is screwed into the front end of the cylinder housing. Here too it is necessary because of the arrangement of the thread on the cylinder housing to make the wall thickness of the housing greater than is necessary for the inside pressure.

Therefore the basic purpose of the present invention is to provide a piston-cylinder unit of the above-mentioned type which does not have the mentioned disadvantage and in which the wall thickness of the cylinder housing can be measured according to the occurring inner pressures, without interferring with the stability of the connection.

This purpose is inventively attained by the front end of the cylinder housing being bent radially outwardly and the radially bent flange forming with its axially facing front surface a stop surface and with its axially facing rear surface the contact surface.

In this manner, a separate clamping ring is not needed, the function of which is taken over by the radial flange. Together with the clamping ring the arrangement of an annular groove is also not needed, so that the wall thickness is not influenced by the connection. All in all, a simpler and less expensive arrangement is thus obtained, which has few parts, a light weight and can be produced with a minimum of material input. The latter permits a manufacture of corrosion-resistant material for example of V2A-steel, without effecting an excessive increase in price of the manufacture. A further advantage can be seen in the radial flange forming both the stop surface for the cylinder end cap and also the contact surface for the screw collar ring, so that during a guiding of the end cap, the applied clamping force and the counterforce which is directed opposite thereto act onto the same cylinder housing area, namely onto the radial flange. The radial flange is, so to speak, clamped between the cylinder end cap and the screw collar ring. Compared with this in the conventional arrangement, a torque is applied onto the clamping ring, because the contact surface is arranged radially offset with respect to the front edge of the cylinder housing, which serves as a stop surface, which can result in deformations.

In principle, it is possible for the radial flange to be bent also radially inwardly. In order not to unnecessarily reduce the inside of the cylinder housing and to influence the piston stroke, it is, however, advantageous that the radial flange be bent outwardly in radial direction.

The radial flange is manufactured advantageously by axial compression, pressing or flanging, for example wobble flanging.

In an embodiment, which is particularly preferable with respect to stability, it is provided that the radial flange contains an axially frontwardly facing bent portion which forms the stop surface and a rearwardly facing bent portion which extends parallel to the front facing portion, is opposite same and forms the contact surface, which bent portion is separated from the outer bent portion by a 180° bead. The free end of the bent radial flange is preferably formed by the rearwardly facing bent section.

BRIEF DESCRIPTION OF THE DRAWING

Exemplary embodiments of the invention will now be described with reference to the drawing, in which.

DETAILED DESCRIPTION

Figure 1:
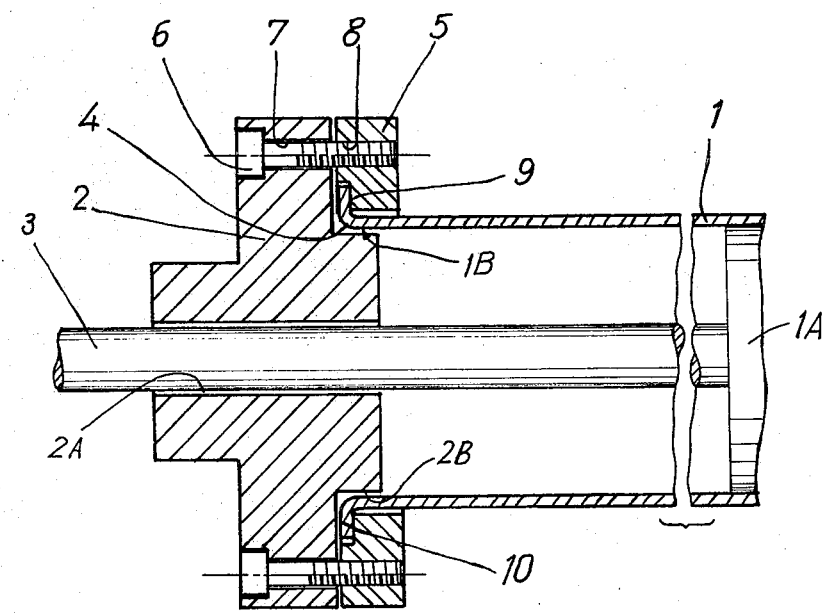
FIG. 1 is a longitudinal cross-sectional view of a piston-cylinder unit loosely connected together.

FIG. 1 illustrates a cylinder housing 1 of a piston-cylinder unit, in which a piston 1A is movably guided back and forth along the axis of a center opening 1B in the cylinder housing 1. A cylinder end cap 2 is secured to the front or left end of the cylinder housing 1. The end cap has a centrally positioned hole 2A therethrough through which extends a piston rod 3 connected to the piston 1A. Of course, the present invention relates thereby also to full cylinder end caps. The cylinder end cap 2 is releasably connected to the cylinder housing 1 on one side of a radial flange 10. The end cap 2 has a central guide surface 2B which engages a radially directed stop surface 4 on the inner surface of the cylinder housing 1. A screw collar ring 5 is disposed on the other side of the radial flange 10 and is loosely positioned on the periphery of the cylinder housing 1 and held in position by screws 6 which are received in aligned openings 7, 8 in the cylinder end cap 2 and the screw collar ring 5, the openings 8 in the collar ring 5 being internally threaded. The screw collar ring 5 is loosely movable only in direction away from the cylinder end cap 2 and radial flange 10 (when the screws 6 are loose)

while it becomes fixed to the cylinder housing 1 and cylinder end cap 2 when the screws are tightened.

As can be seen from FIG. 1, the front or left end of the cylinder housing 1 is bent in radial direction so that the radially outwardly bent flange 10 is formed having a contact surface 9 on the side thereof remote from the end cap 2. The axially outer or left end surface of the flange 10 forms the stop surface 4 which is associated with the cylinder end cap 2, while the oppositely axially facing surface of the flange 10 defines the contact surface 9 which is associated with the screw collar ring 5. During a fastening of the cylinder end cap 2 with the screws 6, the screw collar ring 5 and the cylinder end cap 2 are thus urged toward one another to engage opposite sides of the bent flange 10. The tensioning force and the counterforce which is directed opposite to said tensioning force, namely the two clamping forces which are applied by the screw collar ring 5 and the cylinder end cap 2, act onto the flange 10 with the same radius and the same strength. A strong connection is obtained in this manner, which connection can be released at any time.

This type of connection does not influence thereby in any manner the wall thickness of the cylinder housing 1, namely the wall thickness can be limited to a minimum value which depends only from the inner pressures which occur in the cylinder housing.

The flange 10 is bent outwardly in radial direction. Thus the volume of the inside of the cylinder housing is not affected and the piston stroke is not limited, as this would be the case with inwardly bent flanges, which can easily be understood.

Various possibilities exist for the manufacture of the bent flange 10. Thus it can be manufactured for example through axial compression, pressing or flanging, for example wobble flanging.

Figure 2:
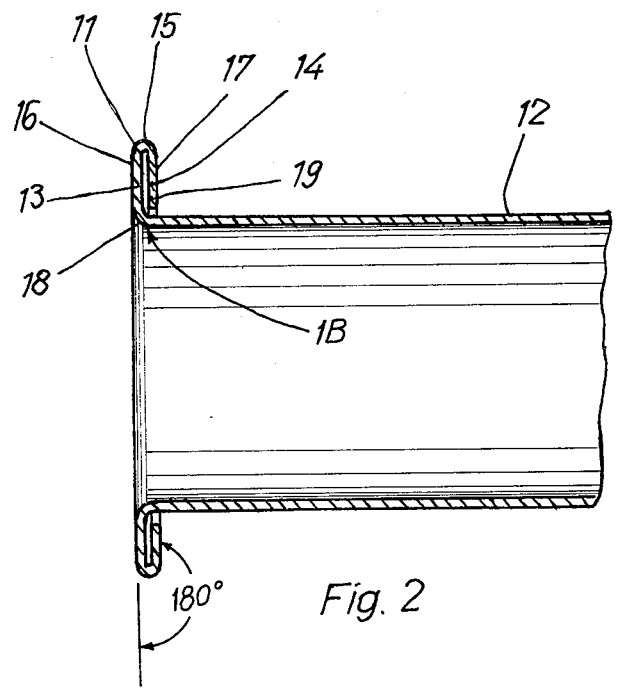
FIG. 2 is a partial longitudinal cross-sectional view of a cylinder housing of a different embodiment of the invention.

As in the case of the exemplary embodiment according to FIG. 1, a bent flange 11 of the cylinder housing 12 in FIG. 2 is provided and the screw collar ring, the cylinder end cap closing off the central opening 1B and the piston rod are not illustrated for purposes of clarity. The screw collar ring, cylinder end cap and piston rod are constructed like in the case of the exemplary embodiment according to FIG. 1. The flange 11 contains now an axially formed facing bent portion 13 and a rearward facing bent portion 14 which extends parallel to said outer bent portion 13 and is opposite to same and the two bent portions 13, 14 are separated by a 180°—bead 15. The frontward facing portion 13 forms hereby a stop surface 16, which is associated with the cylinder end cap, while the rearward facing portion 14 forms a contact surface 17 which is associated with the screw collar ring. Viewed as a whole, an arrangement is obtained in this case, in which, viewed along a surface line of the cylinder housing 12, there exists first a 90°—bent section 18, after which follows the outer bent portion 13 which extends in radial direction outwardly and which then transfers through the 180°—bead 15 into the inner bent portion 14. The free end 19 of the bent ring portion 11 is thus formed by the inner bent portion 14.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A piston-cylinder unit, comprising:
   an elongated and hollow housing having a central opening at one end and a laterally extending flange means at said one end thereof, said flange means consisting of a first portion integral with said housing and extending laterally from said housing and a second portion integral with said first portion extending coextensively parallel to said first portion but spaced axially therefrom, said first and second portions having a 180° angle bead portion therebetween;
   releasable end cap means secured to said housing at said one end thereof, said end cap means including an end cap member engaging a first axially facing surface on said first portion and covering said central opening in said hollow housing at said one end, said end cap means further including an annular collar engaging a second axially facing surface on said second portion, said first and second axially facing surfaces facing in opposite longitudinal directions; and
   fastener means for securing said end cap member to said annular collar and clamping said flange means therebetween.

* * * * *